Patented July 24, 1934

1,967,225

UNITED STATES PATENT OFFICE 1,967,225

PROCESS FOR THE MANUFACTURE OF METHYL VINYL KETONE

Rollin F. Conaway, Wilmington, Del., assignor to E. I. du Pont de Nemours & Company, Wilmington, Del., a corporation of Delaware No Drawing. Application August 26, 1932, Serial No. 630,535

15 Claims. (Cl. 260—134)

This invention relates to an improved method for the preparation of methyl vinyl ketone by the hydration of the triple bond of monovinylacetylene.

Methyl vinyl ketone has been prepared previously by the following methods:

(1) Removing hydrogen chloride from chloroketones with diethylaniline—Blaise and Maire, Bull. Soc. Chim., (4), 3, 265–86, 413–27, 543–51, and 658–74, (1908). Compt. Rend., 142, 215–17, (1906); and 145, 73–75 (1907).

(2) Oxidation of methyl vinyl carbinol, Delaby, R., Compt. Rend., 175, 967–70, (1922); 182, 140–42, (1926); and Bull. Soc. Chim., (4), 33, 602–26 (1923).

(3) By condensing ethylene with acetyl chloride in the presence of aluminum halides, Krapiwin, B., Chem. Zentr., 81, (1), 1335–36, (1910).

(4) By dehydrating ketoalcohols. Bayer and Co., German Patent 222,551 (1909), (U. S. Patent 989,993 (1911)).

(5) By hydrating monovinylacetylene, as described in Carter U. S. application Serial No. 495,001, filed November 11, 1930. Carter discloses the preparation of methyl vinyl ketone by reacting monovinylacetylene in water in the presence of a hydration catalyst taken from the group consisting of the salts, oxides or hydroxides of mercury, calcium, silver, cadmium and zinc, the catalyst being dissolved in an aqueous solution of a mineral acid.

The hydration of monovinylacetylene proceeds according to the following equation:

$$CH_2=CH-C\equiv CH+H_2O \rightarrow CH_2=CH-C(O)-CH_3$$

Mercury catalysts represent the most satisfactory form of catalysts for the reaction. In accordance with the present invention it has been found that the addition of an oxidizing agent to the mercury catalyst greatly prolongs the life and efficiency of the catalyst, while at the same time increasing the yields of methyl vinyl ketone which are obtainable.

It is therefore an object of the invention to effect the catalytic hydration of monovinylacetylene in the presence of a solution of mercury salt promoted by the addition of an oxidizing agent. A further object of the invention resides in the use of an oxidation inhibitor which is added to the reaction mixture to prevent polymerization of the formed methyl vinyl ketone. Other objects of the invention will appear in the following detailed description.

The following examples illustrate preferred forms of the invention and are to be construed as illustrative only:

*Example I.*—A reaction mixture of the following composition is prepared:

| | Parts by weight |
|---|---|
| Potassium bisulfate | 72 |
| Mercuric oxide | 10 |
| Ferric sulfate | 10 |
| Sulfuric acid (sp. gr. 1.84) | 37 |
| Water | 500 |

This solution is placed in a reaction flask, maintained at a temperature of 50–80° C. by means of circulating water and agitated vigorously with a mechanical stirrer. As soon as the potassium bisulfate dissolves 300 to 700 parts by weight of monovinylacetylene are passed in, as a gas, at the rate of 100 parts by weight per hour. A solvent trap cooled with acetone and dry ice is connected to the reaction vessel in order to condense the unabsorbed monovinylacetylene. If the catalytic mixture is vigorously agitated and the temperature kept between 50–80° C. the absorption is practically complete. At the completion of the reaction (when all of the monovinylacetylene has been absorbed) a small amount of hydroquinone (2 parts by weight) is added to the reaction mixture, and the entire solution distilled at atmospheric pressure. The distillate is a clear aqueous solution of methyl vinyl ketone. The methyl vinyl ketone is separated from the water by saturating the distillate with potassium carbonate and decanting the methyl vinyl ketone layer from the aqueous layer. The crude methyl vinyl ketone is dried over calcium chloride and purified by fractional distillation under reduced pressure, collecting the methyl vinyl ketone in the fraction that boils at 28–34° C. at 120 mm. pressure. The pure methyl vinyl ketone is a colorless liquid with pronounced lachrymatory properties and soluble in practically all organic solvents except hydrocarbons in which it is slightly soluble. The pure methyl vinyl ketone is stabilized (against polymerization) by adding 0.1% of hydroquinone. The yield of methyl vinyl ketone (based on the monovinylacetylene absorbed which is practically quantitative), is 85% of the theoretical.

When the procedure and the catalyst described by Carter in his application Serial No. 495,001 was employed a yield of methyl vinyl ketone of only 23% of the theoretical was obtained. One hundred parts by weight of monovinylacetylene were passed into a catalyst mixture composed of:

| | Parts by weight |
|---|---|
| Mercuric oxide | 44 |
| Sulfuric acid (sp. gr. 1.84) | 90 |
| Water | 120 | at a temperature of 30° C. The reaction products were isolated by steam distillation at 200 mm. pressure and the methyl vinyl ketone separated from the distillate by saturating with potassium carbonate and decanting the methyl vinyl ketone layer (30 parts by weight) from the aqueous layer.

*Example II.*—A reaction mixture of the following composition is prepared:

5 g. of mercuric oxide
3 g. of ferric oxide
25 g. of sulfuric acid (sp. gr. 1.84)
168 g. of water To this catalytic mixture 100 g. of monovinylacetylene are added, as a gas, under the same conditions as described in Example I, and the resulting methyl vinyl ketone is isolated in the same manner. Yield of methyl vinyl ketone = 63% of theoretical.

*Example III.*—A reaction mixture composed of 50 parts by weight of mercuric oxide, 102 parts by weight of sulfuric acid (sp. gr. 1.84), and 750 parts by weight of water was placed in a reaction vessel maintained at a temperature of 50°–80° C. by circulating water and agitated vigorously with a mechanical stirrer. This catalyst was the same as employed by Carter in his application Serial No. 495,001. Seven hundred fifty parts by weight of monovinylacetylene as gas was allowed to bubble into this mixture during about eight hours. When all the monovinylacetylene was absorbed, the reaction mixture was distilled at atmospheric pressure. A small amount of hydroquinone was added to the clear distillate which was next saturated with potassium carbonate and the methyl vinyl ketone layer which separated, was decanted from the aqueous layer. The yield of methyl vinyl ketone containing a small amount of water was about 48% by weight. This process of manufacture was repeated using the same apparatus, identical conditions of adding monovinylacetylene and employing the same procedure for isolating the methyl vinyl ketone but modifying the catalyst. Seven hundred fifty parts by weight of gaseous monovinylacetylene were added to a reaction mixture composed of 72 parts by weight of potassium acid sulfate, 50 parts by weight of mercuric oxide, 10 parts by weight of copper sulfate, 50 parts by weight of sulfuric acid, and 750 parts by weight of water. The yield of methyl vinyl ketone containing a small amount of water was about 70% by weight.

One of the advantages involved in the practice of the present invention resides in retaining the catalytic mercuric salt in the state of its highest valence. The presence of the oxidizing agent which is added to the catalyst effects this result directly during reaction. The catalyst can be maintained in an active state by other means, though not so effectively. Thus, a portion of the catalyst can be continually withdrawn and passed thru an electrolytic cell, being continuously returned to the reaction zone, or air, oxygen, or ozone can be blown into the catalytic mixture alone or in the presence of air oxidation catalysts such as iron, cobalt, manganese, and the like.

Acids which are suitable in lieu of sulfuric acid, are phosphoric acid, sulfoacetic acid, and any other strong, relatively non-oxidizing acid in which mercuric oxide will dissolve.

Satisfactory oxidizing agents which serve as promoters for the mercury catalysts are the salts of copper, iron, and vanadium, wherein the metals possess their higher valences. Salts of these metals may be added to the catalytic mixture, or they may be formed in situ by the addition of one of the metals or its oxides to the acid solution of the mercuric salt. Other oxidizing catalysts which may be used in conjunction with the mercuric hydration catalysts are chromates, manganates or vanadates. These salts have a strong oxidizing action on the mercuric salts. They may be chemically combined with iron, copper, etc., if desired.

The preferred acids are ternary acids, preferably in concentrated form and of the character defined above in describing the types of mercury catalysts which may be used. In addition to the ternary acids, however, hydrohalogen acids such as hydrochloric or hydrobromic acids may be used, although the yields of methyl vinyl ketone are not as good as those obtained for example by the use of oxygenated acids, such as sulfuric, phosphoric, and the other ternary acids named.

It is preferred that the catalytic mixture contain an alkali metal bisulfate, for example the bisulfates of sodium, potassium, lithium, rubidium, cesium, and ammonium. While I do not wish to be limited to theory, it is thought that the alkali metal bisulfate acts as a buffer, its function probably being to maintain a more uniform acidity than could be obtained in the absence of such compound.

The preferred method of operating this process is to pass the monovinylacetylene, as a gas, into the improved catalytic mixture with rapid stirring at a temperature of 50°–80° C. The rate of stirring and temperature of the catalytic mixture are important factors in determining the rate of absorption of the monovinylacetylene. The rate and extent of absorption of the monovinylacetylene by the catalytic mixture depends on the formation and subsequent decomposition of an intermediate formed between the monovinylacetylene and the active catalyst. If the temperature is too low the decomposition of the intermediate is retarded and the absorption of the monovinylacetylene decreased. Likewise, if the catalytic mixture is not agitated rapidly the absorption is decreased. At the completion of the reaction (when all of the monovinylacetylene has been absorbed) a small amount of an inhibitor is added and the entire reaction mixture distilled. The methyl vinyl ketone is separated from the aqueous distillate by adding potassium carbonate, calcium chloride, sodium chloride, etc., and separating the methyl vinyl ketone from the aqueous layer. The methyl vinyl ketone can also be separated from the aqueous distillate by extraction with organic solvents, esters, ethers, etc., or by distillation in the presence of a third component which forms a binary with water. The resulting methyl vinyl ketone is dried with a suitable drying agent such as calcium chloride, sodium sulfate, etc., further purified by fractional distillation, (collecting the material which boils at 28°–34° C. at 120 mm.), and stabilized by the addition of an inhibitor, such as hydroquinone, pyrogallol, catechol, eugenol, guaiacol, etc. The inhibitor can be separated from the stabilized methyl vinyl ketone by distillation.

The identity of methyl vinyl ketone as the main, if not the sole product of this reaction has been confirmed by preparing the derivative 3-methyl-1-phenylpyrazoline, which possesses the same melting point and characteristic chemical properties as the compound described in the literature (Blaise and Maire—Bull. Soc. Chim. (4), 3, 265–86 (1908)).

This process can also be operated under pressure, e. g., by sealing the reactants along with the improved catalyst described above in a pressure vessel and shaking, or stirring vigorously until the reaction is complete. The methyl vinyl ketone can then be isolated in the same manner as described above.

The process is preferably carried out with monovinylacetylene in the vapor phase, but the invention also includes within its scope hydration of liquid monovinylacetylene, preferably under pressure.

Another method of employing this improved catalyst is to pass the monovinylacetylene, as a gas, into the catalytic mixture at such a temperature that the methyl vinyl ketone along with a small amount of water distils out of the catalytic mixture.

In a continuous process the life and activity of the catalyst can be greatly prolonged by the addition of oxidizing agents (copper sulfate, ferric sulfate, vanadium sulfate, etc.) to the catalytic mixture from time to time. The aqueous solution of methyl vinyl ketone can be removed thru a side tube and the unreacted monovinylacetylene along with an equivalent amount of water to replace that removed returned to the catalytic mixture.

The temperature of the reaction mixture can be maintained from 0° C. to the temperature at which methyl vinyl ketone distils out of the catalytic mixture (75°–85° C.). The best results have been obtained by keeping the temperature between 50° and 85° C.

The concentration of acid can be varied widely but the best results have been obtained with an acid concentration of 10–50%.

The concentration of the catalyst may be varied up to the maximum solubility of the catalyst in the acidic medium.

The concentration of the oxidizing agent depends on the type of oxidizing agent employed but the concentration of the oxidizing agent should be sufficient to keep the catalyst in an active state.

The methyl vinyl ketone can be separated from the catalytic mixture in a number of ways: (1) Batch distillation. The entire reaction mixture is distilled at atmospheric or reduced pressure. An inhibitor is added to the distillate in order to prevent polymerization. (2) The reaction can be operated at such a temperature that the methyl vinyl ketone distils out of the catalytic mixture as soon as it is formed. An inhibitor should be added to the isolated methyl vinyl ketone to prevent polymerization. (3) The methyl vinyl ketone can be separated from the catalytic mixture by extraction with ether, benzene, chloroform, carbon tetrachloride and esters such as ethyl, ethyl acetate, etc. (4) By adding a neutral or acid salt such as sodium sulfate or sodium acid sulfate to the catalytic mixture the methyl vinyl ketone can be continuously decanted.

In all cases where the methyl vinyl ketone is distilled from the reaction mixture an aqueous distillate will be obtained. The methyl vinyl ketone can be isolated from the distillate or isolated from water at any time by salting out with calcium chloride, sodium, chloride, potassium carbonate, sodium carbonate, etc., or the solution may be fractionated with or without an additional material such as benzene. This may be done in a separate operation or as a part of the step or separating the methyl vinyl ketone from the reaction mixture. In all cases where pure methyl vinyl ketone or an aqueous solution of methyl vinyl ketone is obtained on being distilled, an inhibitor such as hydroquinone, pyrogallol, catechol, guaiacol, eugenol, parahydroxy diphenyl, etc., should be added in order to prevent the polymerization of the methyl vinyl ketone.

The advantage of this process is that the addition of an oxidizing agent such as copper sulfate or ferric sulfate to the catalytic mixture greatly increases the life and activity of the catalysts, which greatly increases the yields of methyl vinyl ketone. The addition of the oxidizing agent increases the speed of conversion and causes the improved catalyst to have a greater capacity for methyl vinyl ketone production per unit weight of mercury. The presence of an alkali metal bisulfate in the catalyst mixture also materially assists in increasing the yields of methyl vinyl ketone.

The addition of an inhibitor to the reaction mixture during the distillation prevents the polymerization of the methyl vinyl ketone in the reaction mixture. Likewise, the addition of an inhibitor to the purified methyl vinyl ketone stabilizes the material against polymerization.

Pure methyl vinyl ketone polymerizes on standing or by heating to a clear, tough, thermoplastic polymer. These polymers are useful in a number of fields, especially as an adhesive for regenerated cellulose film, as the inner layer in safety glass, as a component of plastics and as a component of coating and impregnating compositions.

The above description and examples are to be taken as illustrative only and not as limiting the scope of the invention. Any modification or variation therefrom which conforms to the spirit of the invention is intended to be included within the scope of the claims.

I claim:

1. A process for the manufacture of methyl vinyl ketone which comprises reacting monovinylacetylene with water in the presence of a mercuric salt dissolved in an aqueous solution of an acid, and promoted by the presence of an oxidizing agent.

2. The process of claim 1 in which the oxidizing agent is taken from the class consisting of air, oxygen, ozone, cupric salts, ferric salts, vanadates, chromates, and manganates.

3. The process of claim 1 in which the oxidizing agent is taken from the class consisting of cupric salts, ferric salts, vanadates, chromates, and manganates.

4. The process of claim 1 further characterized in that the methyl vinyl ketone is distilled from the reaction mixture in the presence of an oxidation inhibitor.

5. The process of claim 1 in which the catalytic mixture contains an alkali metal bisulfate.

6. The process of claim 1 in which the oxidizing agent is taken from the class consisting of cupric salts, ferric salts, vanadates, chomates, and manganates, and in which the reaction takes place in the presence of an alkali metal bisulfate.

7. The process of claim 1 in which the oxidizing agent is taken from the class consisting of cupric salts, ferric salts, vanadates, chromates, and manganates, and the acid being present during the reaction in a concentration of from 10% to 50%.

8. The process of claim 1 in which the acid is a ternary acid.

9. The process of claim 1 in which the oxidizing agent is taken from the class consisting of cupric salts, ferric salts, vanadates, chromates, and manganates, the reaction furthermore being carried out at a temperature of from 50° to 85° C.

10. A process for the manufacture of methyl vinyl ketone which comprises reacting monovinylacetylene with water in the presence of a mercuric salt dissolved in an aqueous solution of sulfuric acid and promoted by the presence of an oxidizing agent taken from the class consisting of air, oxygen, ozone, cupric salts, ferric salts, vanadates, chromates, and manganates.

11. A process for the manufacture of methyl vinyl ketone which comprises reacting monovinylacetylene with water in the presence of a mercuric salt dissolved in an aqueous solution of sulfuric acid and promoted by the presence of a ferric salt.

12. The process of claim 11 in which the catalytic mixture contains an alkali metal bisulfate.

13. A process for the manufacture of methyl vinyl ketone which comprises reacting monovinylacetylene with water in the presence of a mercuric salt dissolved in an aqueous solution of sulfuric acid and promoted by the presence of a cupric salt.

14. The process of claim 13 in which the catalytic mixture contains an alkali metal bisulfate.

15. A process for the manufacture of methyl vinyl ketone which comprises reacting monovinylacetylene with water in the presence of a mercuric salt dissolved in a 10% to 15% aqueous solution of sulfuric acid, and promoted by the presence of a cupric salt and an alkali metal bisulfate, said reaction being carried out at a temperature of from 50° to 85° C.

ROLLIN F. CONAWAY.